(12) United States Patent
Imura

(10) Patent No.: US 7,906,748 B2
(45) Date of Patent: Mar. 15, 2011

(54) INDUCTION HEATABLE COOKWARE AND SERVING WARE, METHOD OF MAKING INDUCTION HEATABLE ITEMS, AND COATING FOR MAKING INDUCTION HEATABLE ITEMS

(76) Inventor: Mamoru Imura, Overland Park, KS (US)

( * ) Notice: Subject to any disclaimer, the term of this patent is extended or adjusted under 35 U.S.C. 154(b) by 0 days.

(21) Appl. No.: 11/266,104

(22) Filed: Nov. 3, 2005

(65) Prior Publication Data

US 2006/0118548 A1 Jun. 8, 2006

Related U.S. Application Data

(60) Provisional application No. 60/624,839, filed on Nov. 3, 2004.

(51) Int. Cl.
*H05B 6/10* (2006.01)
(52) U.S. Cl. .......... 219/622; 219/634; 126/390.1
(58) Field of Classification Search .......... 219/620–622, 219/634, 649; 126/390.1; 427/191; 29/592, 29/592.1, 602.1, 502.1; 428/35.8, 35.9, 35.3
See application file for complete search history.

(56) References Cited

U.S. PATENT DOCUMENTS

| 4,614,852 | A | * | 9/1986 | Matsushita et al. .......... 219/621 |
| 5,324,785 | A | * | 6/1994 | Noda et al. .......... 525/276 |
| 6,206,564 | B1 | | 3/2001 | Ademczewski |

FOREIGN PATENT DOCUMENTS

| JP | 08-069868 | | 3/1996 |
| JP | 8-69868 | * | 3/1996 |
| JP | 2003-199671 | * | 7/2003 |

OTHER PUBLICATIONS

International Search Report, PCT/US05/39929, mailed Oct. 5, 2006.
First Amended Complaint in Case No. 08-CV-2220-JWL-DJW, *Thermal Solutions, Inc.* v. *Imura International U.S.A. Inc., Vita Craft Corporation, and Mamoru Imura*, Jul. 11, 2008.

* cited by examiner

*Primary Examiner* — Quang T Van
(74) *Attorney, Agent, or Firm* — Bryan P. Stanley; Kutak Rock LLP

(57) ABSTRACT

Induction heatable cookware and servingware items, and methods and coatings for making induction heatable items are provided. The items of the instant invention are made by applying a ferromagnetic coating to a nonmagnetic item. The ferromagnetic coating is made by grinding or pulverizing a ferromagnetic material, such as steel or iron, into a powder and mixing it with a suitable coating material for the item.

11 Claims, 1 Drawing Sheet

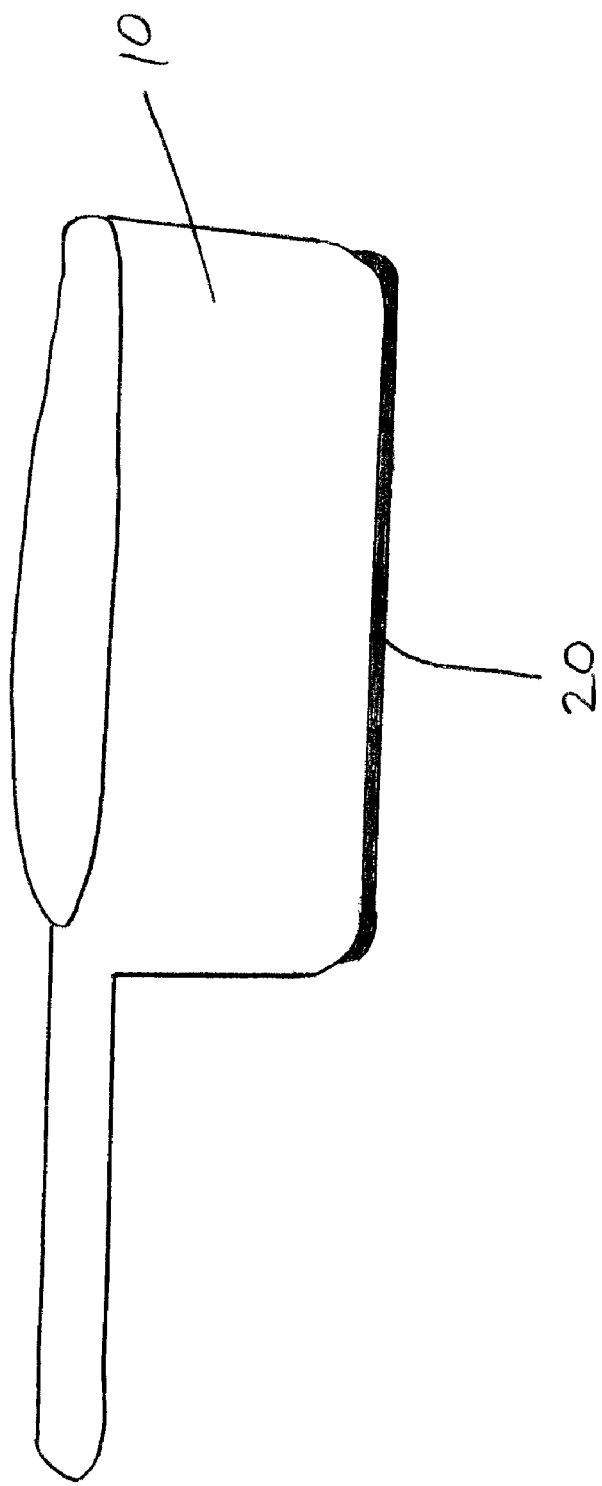

INDUCTION HEATABLE COOKWARE AND SERVING WARE, METHOD OF MAKING INDUCTION HEATABLE ITEMS, AND COATING FOR MAKING INDUCTION HEATABLE ITEMS

This application claims priority pursuant to 35 U.S.C. 119(e) to U.S. Provisional Patent Application Ser. No. 60/624,839, filed Nov. 3, 2004, the entire disclosure of which is incorporated herein by reference.

FIELD OF THE INVENTION

The present invention is broadly concerned with induction-heatable cookware and servingware items, such as pots, pans, buffet serving pans, serving dishes, platters, and the like, and method of making induction-heatable cookware items. More particularly, the invention is concerned with constructions for and methods of making induction-heatable items, methods of making non-ferric items suitable for induction heating, and ferromagnetic coating compositions for use on non-ferric cookware and servingware items.

BACKGROUND OF THE INVENTION

Induction cooktops have many advantages over other cooking methods, including efficiency, controllability, and safety. Each hob of an induction cook-top contains one or more coils made of ferromagnetic material. As an alternating current is passed through these coils in the hob, a magnetic field of the same frequency is produced. When a magnetic-based pan is placed on the hob, the magnetic field induces a current in the pan. The internal resistance of the pan causes heat to be dissipated, following the Joule effect and the pan itself, and not the cook-top, heats up and cooks the food. When the pan is removed from the cook-top, the energy transfer stops. The result is a flameless method of cooking in which the cook-top surface remains cool at all times. Control of cooking temperatures is achieved quickly, efficiently, and with great precession.

While induction cooking can be utilized in connection with any type of cookware or servingware, such as frying pans, woks, pots, and the like, an induction cook-top can only heat magnetic-based materials that allow an induced current to flow within them, such as iron and steel. Thus, aluminum, copper, glass or pyrex items cannot be heated by an induction cook-top. Examples of items manufactured so that they are heatable by induction are disclosed in U.S. patent application Ser. No. 10/833,356, the entire disclosure of which is incorporated herein by reference in its entirety. Although a number of materials can be utilized for fabrication of a pan body capable of induction heating, the construction of a multi-ply body comprising layers of several different materials is quite common. The specific material used for each ply or layer, the thickness of each layer, and the total number of layers will vary depending upon the size, shape, desired appearance and desired heating characteristics of the pan. In an exemplary embodiment, the pan body is a 5-ply construction, including a first layer of magnetic stainless steel forming the interior cooking surface of the pan, a second inner-layer of 3003 pure aluminum, a third inner-layer of 1145 aluminum alloy, a fourth inner-layer of 1145 aluminum, and a fifth layer of magnetic stainless steel forming the exterior surface of the pan. The two surface layers of magnetic stainless steel provide strength, durability, easy cleaning and a long-lasting, attractive appearance to the pan body. The exterior surface layer of magnetic stainless steel builds up heat generated from a stove cook-top (either by conduction in a traditional stove, or by induction utilizing the ferromagnetic properties of the steel in an induction stove) generally at the center of the base of the pan body. The three layers of aluminum and aluminum alloy, which form an aluminum core for the pan, absorb heat quickly from the exterior layer of steel, and smoothly and evenly distribute the heat through conduction across the bottom and sides of the pan body to the inner layer of steel.

Although cookware manufactured of non-magnetic materials such as aluminum, copper, glass or pyrex are not capable of induction heating, there are many advantages to non-magnetic materials that are not present in magnetic materials such as steel or iron. For example, aluminum cookware is preferred by many cooks due to its lighter weight. Therefore, it would be beneficial to provide a means for utilizing cookware and/or servingware manufactured primarily of non-magnetic materials with induction heating systems.

SUMMARY OF THE INVENTION

An object of the instant invention is to provide a means for utilizing cookware and/or servingware manufactured primarily of non-magnetic materials with induction heating systems. Another object of the instant invention is to provide novel constructions for induction-heatable items. Still another object of the instant invention is to provide methods of making induction heatable cookware and servingware. Yet another object of the instant invention is to provide a coating composition and method of making a coating for making non-magnetic cookware and servingware objects heatable by induction.

The above described objects are achieved through the use of a ferromagnetic coating that is applied to an exterior surface, or surfaces, of non-magnetic objects, such as aluminum pots or pans. The ferromagnetic coating is made by grinding or pulverizing a ferromagnetic material, such as steel or iron, into a fine powder and mixing it with a suitable coating (such as a paint, a silicone base or a fluorocarbon (P.T.F.E.) base coating for cookware, or any other suitable coating now known or hereafter discovered). The amount of ferromagnetic material in the coating for an object will vary depending upon the characteristics of the object being coated, such as the size, shape, materials, etc. The coating used for a particular object will include enough ferromagnetic material to render the object magnetic and thus capable of induction heating. The amount of ferromagnetic material may be adjusted to provide the specific heating characteristics desired for the object.

In a preferred embodiment the coating of the instant invention starts out as a liquid that can be applied to the object to be coated in any manner known in the art or hereafter discovered, such as by spraying, brushing, dipping, etc. As the coating dries it will harden. An exemplary liquid coating for a cookware object (such as a pot or pan) is made by starting with a traditional liquid coating material, such as an exterior paint, a silicone base or a fluorocarbon (P.T.F.E.) base material, and mixing in the ferromagnetic material, which has been ground or pulverized into a fine powder. In an alternative embodiment, the coating may be a solid film that is applied to the exterior of the item being coated in a manner know or hereinafter discovered, such as by heat shrinking.

The coating of the instant invention allows the advantageous characteristics of non-magnetic materials to be utilized, while at the same time utilizing the advantages of induction heating. For example, cooks that prefer light weight aluminum cookware can continue to use such cookware on induction stoves.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

FIG. 1 is an elevation view of a pan utilizing the coating of the instant invention.

DETAILED DESCRIPTION OF A PREFERRED EMBODIMENT

As required, a detailed embodiment of the present inventions is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to FIG. 1, a preferred embodiment of a pan of the instant invention is shown. The body of pan 10 is manufactured of a non-magnetic material, such as aluminum, in the manner that is well known for such an item. Once pan 10 has been manufactured, it is not capable of induction heating due to its non-magnet characteristics. Coating 20 is applied to the bottom of pan 10 after pan 10 has been manufactured of the non-magnetic material. In the embodiment shown in FIG. 1, coating 20 is sprayed in a liquid form onto the bottom surface of pan 10 in a manner that is well know for applying exterior coatings, such as paint, to pan surfaces. In the embodiment shown in FIG. 1, coating 20 is made by grinding or pulverizing a ferromagnetic material, such as steel or iron, into a fine powder and mixing it with a traditional exterior paint for pan 10.

Although coating 20 is applied to pan 10 through spraying in the described embodiment, it will be appreciated that the coating of the instant invention may be applied to an item in any manner known in the art or hereafter discovered for applying liquid coating, such as by brushing, dipping, etc. Furthermore, it will be appreciated that non-liquid coatings and methods of applying the same may be utilized without departing from the spirit and scope of the instant invention.

Although coating 20 is applied only to the bottom of pan 10 in the above-described embodiment, it will be appreciated that the coating of the instant invention may be applied to the entire surface of pan 10, or otherwise to any selective portion or portions of any surface of the item being coated. The particular portion(s) of the exterior surface(s) of an item that are coated, will depend upon the areas in which it is desired that heat be generated, as well as the properties of the item being coated and the desired heating characteristics.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A method of making an induction heatable item, comprising the steps of:
    obtaining a ferromagnetic material;
    adding said ferromagnetic material to a coating material to make a ferromagnetic coating; and
    applying said ferromagnetic coating to at least a portion of a surface of a body of a non-ferromagnetic item, wherein
    said step of obtaining a ferromagnetic material includes the step of obtaining a ferromagnetic powder,
    said step of adding said ferromagnetic material to a coating includes the step of adding said ferromagnetic powder to a traditional coating material to make said ferromagnetic coating,
    said step of obtaining a ferromagnetic powder includes the step of grinding or pulverizing a ferromagnetic material to a fine powder, and
    said step of applying said ferromagnetic coating to at least a portion of a surface of a body of a non-ferromagnetic item includes the steps of (i) forming a solid film from the ferromagnetic coating and (ii) heat shrinking the solid film onto a surface of the body of the non-ferromagnetic item.

2. The method as claimed in claim 1 wherein said traditional coating material is a liquid coating material including a liquid, and said step of adding said ferromagnetic powder includes the step of mixing said powder into said liquid.

3. The method as claimed in claim 1 wherein said ferromagnetic coating comprises a liquid.

4. The method as claimed in claim 1 wherein said ferromagnetic coating is capable of being sprayed in a liquid form onto a surface of the body of the non-ferromagnetic item.

5. The method as claimed in claim 1 wherein said ferromagnetic coating is capable of being brushed in a liquid form onto a surface of the body of the non-ferromagnetic item.

6. The method as claimed in claim 1 wherein said ferromagnetic coating is capable of being a ferromagnetic coating dip such that said non-ferromagnetic item may be dipped into said ferromagnetic coating dip while said ferromagnetic coating is in a liquid form.

7. The method as claimed in claim 1, wherein said ferromagnetic coating is a silicone base or a fluorocarbon base material.

8. A method of making ferromagnetic coating for making a non-ferromagnetic item heatable by induction, said method comprising the steps of:
   obtaining a ferromagnetic powder,
   adding said ferromagnetic powder to a traditional coating material to form a ferromagnetic coating material;
   forming a solid film using said ferromagnetic coating material; and
   applying said solid film to an exterior of the item via heat shrinking,
   wherein said method of obtaining a ferromagnetic powder comprises the step of grinding or pulverizing a ferromagnetic material to a fine powder.

9. The method as claimed in claim 8 wherein said traditional coating material comprises a liquid and said step of adding said ferromagnetic powder comprises mixing said powder into said liquid.

10. The method as claimed in claim 8, wherein said ferromagnetic coating material is a silicone base or a fluorocarbon base material.

11. An induction heatable item,
    a body made of a non-ferromagnetic material; and
    a ferromagnetic coating applied to at least a portion of a surface of said non-ferromagnetic body, said ferromagnetic coating including a ferromagnetic material that has been added to a coating material, wherein
    said ferromagnetic coating includes a ferromagnetic powder that has been added to a traditional coating material,
    said ferromagnetic powder is made by grinding or pulverizing a ferromagnetic material to a fine powder,
wherein,
    said traditional coating material is a liquid coating material,
    said ferromagnetic coating is a heat-shrinked solid film on an exterior of the non ferromagnetic body.

* * * * *